United States Patent [19]

Staples

[11] Patent Number: 5,799,036
[45] Date of Patent: Aug. 25, 1998

[54] COMPUTER SYSTEM WHICH PROVIDES ANALOG AUDIO COMMUNICATION BETWEEN A PC CARD AND THE COMPUTER'S SOUND SYSTEM

[76] Inventor: Leven E. Staples, 3423 Fallen Leaf, San Antonio, Tex. 78230

[21] Appl. No.: 496,537

[22] Filed: Jun. 29, 1995

[51] Int. Cl.$^6$ ................................................. H04N 7/14
[52] U.S. Cl. ..................................... 375/222; 395/892
[58] Field of Search ........................... 379/67–68, 388, 379/420; 370/110.1; 381/59; 395/2–2.1, 200.01, 200.09, 200.2, 892, 280–282; 375/222, 8

[56] References Cited

U.S. PATENT DOCUMENTS

| | | | |
|---|---|---|---|
| 4,578,537 | 3/1986 | Faggin et al. | 379/93 |
| 4,597,077 | 6/1986 | Nelson et al. | 370/60 |
| 4,614,114 | 9/1986 | Sagara et al. | 73/313 |
| 4,679,191 | 7/1987 | Nelson et al. | 370/84 |
| 4,916,607 | 4/1990 | Teraichi et al. | 395/834 |
| 4,972,457 | 11/1990 | O'Sullivan | 379/59 |
| 5,136,631 | 8/1992 | Einhorn et al. | 379/67 |
| 5,192,999 | 3/1993 | Graczyk et al. | 384/522 |
| 5,274,738 | 12/1993 | Daly et al. | 395/2 |
| 5,333,266 | 7/1994 | Boaz et al. | 395/200.01 |
| 5,335,276 | 8/1994 | Thompson et al. | 380/21 |
| 5,349,640 | 9/1994 | Dunn et al. | 397/387 |
| 5,353,334 | 10/1994 | O'Sullivan | 379/59 |
| 5,361,061 | 11/1994 | Mays et al. | 340/825.44 |
| 5,392,223 | 2/1995 | Caci | 364/514 A |
| 5,408,614 | 4/1995 | Thornton et al. | 395/841 |
| 5,411,405 | 5/1995 | McDaniels et al. | 439/131 |
| 5,423,697 | 6/1995 | MacGregor | 439/638 |
| 5,426,564 | 6/1995 | Hsu | 361/707 |

(List continued on next page.)

OTHER PUBLICATIONS

Bryan, John, "PCMCIA: Past, Present and Promise," *Byte*, pp. 65–72, Nov. 1994.

Rigney, Steve, "Socket to Us: PCMCIA Connectivity," *PC Magazine*, pp.207–212, Jan. 24, 1995.

Nass, Richard, ("Nass I"), PCMCIA Fax–Modem and LAN Run Simultaneously, *Electronic Design*, pp. 131–132, Oct. 3, 1994.

Nass Richard, ("Nass II"), Multifunction Cards Pose Design Challenges, *Electronic Design*, pp. 51–53, Oct. 3, 1994.

Anderson, Don, "PCMCIA System Architecture," *Mindshare, Inc.*, 1994, pp.1–50.

Rigney, S. "PCMCIA Connectivity: Socket" PC Magazine (Jan. 24, 1995), pp. 207–212.

Nass, R. "PCMCIA Fax–Modem and LAN Run Simultaneously" Electronic Design (Oct. 3, 1994), pp. 131–132.

Nass, R. "Multifunctioning Cards Pose Design Challenges" Electronic Design (Oct. 3, 1994), pp. 51–53.

Bryan, J. "PCMCIA: Past, Present, and Promise" Byte (Nov. 1994), pp. 65–72.

Anderson, D. PCMCIA System Architecture. TX. Mindshare Inc. 1994. pp. 1–50.

*Primary Examiner*—Lance Leonard Barry, Esq.
*Attorney, Agent, or Firm*—Conley, Rose & Tayon; Jeffrey C. Hood

[57] ABSTRACT

A computer system including a PC Card or PCMCIA socket receiving a PC Card modem, wherein the PC Card modem communicates analog audio information to/from the computer's sound system. The present invention also comprises a PC Card modem s which is compatible with the PCMCIA specification and which includes telephone answering device and full-duplex speakerphone capabilities. The computer system and PC Card modem of the present invention utilize one or more pins of the PCMCIA connector for analog audio communication between the computer's sound system and the modem. According to the present invention, the PC Card modem uses the digital SPKR pin to provide analog audio signals from the modem to the computer sound system, and uses a reserved-for-future-use (RFU) pin, preferably pin 57, to provide analog audio from the sound system to the modem. In an alternate embodiment, the PCMCIA modem uses the high order address pins of the PCMCIA connector for input and output analog audio instead of the SPKR and RFU pins.

20 Claims, 9 Drawing Sheets

U.S. PATENT DOCUMENTS

| | | | |
|---|---|---|---|
| 5,428,663 | 6/1995 | Grimes et al. | 379/57 |
| 5,440,585 | 8/1995 | Partridge, III | 375/261 |
| 5,444,768 | 8/1995 | Lemaire et al. | 379/68 |
| 5,444,869 | 8/1995 | Stricklin et al. | 455/89 |
| 5,445,525 | 8/1995 | Broadbent et al. | 439/64 |
| 5,457,782 | 10/1995 | Daly et al. | 395/2 |
| 5,463,742 | 10/1995 | Kobayashi | 395/281 |
| 5,471,470 | 11/1995 | Sharma et al. | 370/81 |
| 5,475,691 | 12/1995 | Chapman et al. | 370/110.4 |
| 5,481,616 | 1/1996 | Freadman | 381/90 |
| 5,517,646 | 5/1996 | Piccirillo et al. | 395/700 |
| 5,519,641 | 5/1996 | Beers et al. | 364/514 C |
| 5,526,408 | 6/1996 | Yekutiely | 379/90 |

| Left signal | Pin | Pin | Right signal |
|---|---|---|---|
| Ground | 35 | 1 | Ground |
| −CD1 | 36 | 2 | Data 3 |
| Data 11 | 37 | 3 | Data 4 |
| Data 12 | 38 | 4 | Data 5 |
| Data 13 | 39 | 5 | Data 6 |
| Data 14 | 40 | 6 | Data 7 |
| Data 15 | 41 | 7 | −CE 1 |
| −CE 2 | 42 | 8 | Address 10 |
| Refresh/−VS1 | 43 | 9 | −OE |
| −IORD | 44 | 10 | Address 11 |
| −IOWR | 45 | 11 | Address 9 |
| Address 17 | 46 | 12 | Address 8 |
| Address 18 | 47 | 13 | Address 13 |
| Address 19 | 48 | 14 | Address 14 |
| Address 20 | 49 | 15 | −WE/PGM |
| Address 21 | 50 | 16 | −IREQ |
| Vcc | 51 | 17 | Vcc |
| Vpp2 | 52 | 18 | Vpp1 |
| Address 22 | 53 | 19 | Address 16 |
| Address 23 | 54 | 20 | Address 15 |
| Address 24 | 55 | 21 | Address 12 |
| Address 25 | 56 | 22 | Address 7 |
| Reserved/−VS2 | 57 | 23 | Address 6 |
| RESET | 58 | 24 | Address 5 |
| −WAIT | 59 | 25 | Address 4 |
| −INPACK | 60 | 26 | Address 3 |
| −REG | 61 | 27 | Address 2 |
| −SPKR | 62 | 28 | Address 1 |
| −STSCHG | 63 | 29 | Address 0 |
| Data 8 | 64 | 30 | Data 0 |
| Data 9 | 65 | 31 | Data 1 |
| Data 10 | 66 | 32 | Data 2 |
| −CD2 | 67 | 33 | −IOIS16 |
| Ground | 68 | 34 | Ground |

COMPUTER SYSTEM WHICH PROVIDES ANALOG AUDIO COMMUNICATION BETWEEN A PC CARD AND THE COMPUTER'S SOUND SYSTEM

FIELD OF THE INVENTION

The present invention relates to a computer system including analog audio communication between a sound system and a PC Card slot, wherein the computer system is adapted to receive a PC Card modem adapted for insertion into the PC Card slot which interfaces to the computer's sound system, and wherein the PC Card modem includes telephone answering device and/or speakerphone capabilities.

DESCRIPTION OF THE RELATED ART

PC Cards were introduced in 1989 under the name "PCMCIA cards" according to a standard developed by the Personal Computer Memory Card International Association (PCMCIA). In 1995 the PCMCIA committee renamed the cards to "PC Cards." The principal benefit of the PC Card standard has generally been portability. The PCMCIA (Personal Computer Memory Card International Association) standard was originally developed for plug-in memory cards for portable and laptop computer systems. However, the PCMCIA standard has grown to encompass a broad array of peripheral devices, including network adapters, modems, flash memory cards, sound cards, global positioning system devices, and others.

The PCMCIA standard is not sanctioned by an official standard's body such as the IEEE (Institute of Electrical and Electronics Engineers) or ANSI (American National Standards Institute), but rather the PCMCIA specification is promulgated by the PCMCIA committee, which provides a series of recommended guidelines for the physical specification of cards, the physical and electrical specification of sockets and the interaction among system software and cards.

The PCMCIA standard requires that all PC Cards have the same length and width, this being 85.6 mm by 54 mm. The PCMCIA standard currently defines three types of PC Cards. Type I cards are limited to a thickness of 3.3 mm and are used principally as memory cards, including RAM cards, ROM cards and DRAM cards. Type II PC Cards can be up to 5.5 mm thick and are large enough to include I/O port connections, and thus most LAN (local area network) adapters and modems are type II PC Cards. Type III cards can be up to 10.5 mm thick and are typically used for products that require moving parts such as hard disks. PCMCIA PC Card slots are backwards compatible with regard to size, i.e., a type III slot also accepts type I and type II cards, but a type I slot will only receive type I cards.

The physical and electrical standards for PC Cards have evolved over time. The original PCMCIA 1.0 standard defined only type I Cards and did not define an I/O feature or software drivers. The PCMCIA 2.0 standard introduced I/O-specific cards, but did not define software driver specifications. Rather, software driver specifications were left to card manufacturers. The PCMCIA 2.1 standard introduced the use of software drivers called Card Services and Socket Services. These software driver standards helped solve many compatibility problems users experienced between different cards and slots. The PCMCIA 2.1 standard also introduced plug-and-play features such as the ability to hot swap cards without rebooting the PC.

The most recent PCMCIA PC Card standard is referred to by the PCMCIA Committee simply as the "PC Card standard" and does not include a version number. This standard includes new specifications for 32 bit bus mastering adapters, on board direct memory access (DMA), multi-function adapters, and reduced power requirements of 3.3 volts.

The PCMCIA specification also governs the driver software specification referred to as card and socket services, which determine how the cards operate. The socket services are a set of BIOS-level drivers that control the physical operation of PCMCIA sockets. Card services also coordinate the system interrupts and memory activities and handle power management tasks.

The PCMCIA standard also requires that each card connect in a PC Card adapter slot using a standard 68 pin connector. For PC Card memory devices, the pins are used primarily for address and data lines, as well as a few control lines. PC Cards configured as input/output (I/O) devices, such as a modem, network adapter, or sound card, define additional signals, including a digital speaker signal referred to as SPKR (pin 62), which provides digital audio signals to the computer system. In addition, in the newer PC Card specification version 2.1, a reserved-for-future-use (RFU) pin (pin 57) is defined for an alternate voltage detect function, and this pin is driven low by a PC Card during startup to indicate to the system that 3 volt operation is permitted by the card.

Computer systems are currently evolving into multimedia systems which have advanced graphics and sound capabilities. Another trend in the computer industry is the marriage of computers with telephones to create computer telephony applications. Thus a computer system may include a telephone which interfaces to a telephone line, or the computer system may implement a virtual telephone on the display screen using the computer's microphone for audio input and the computer's speaker for audio output.

One problem with the PCMCIA specification is that the specification does not allow a PCMCIA PC Card, such as a PC Card modem, to communicate analog audio information directly with a computer's sound system. As noted above, the PCMCIA specification includes a digital speaker signal referred to as SPKR which provides a digital audio signal to the computer system. However, this digital speaker signal is insufficient for modern fax modem and computer telephony applications. Thus, the current PCMCIA specification does not allow for PCMCIA standard cards which support advanced telephony applications such as telephone answering device capabilities and full-duplex speakerphone capabilities.

Therefore, a new computer system and PCMCIA PC Card is desired which adheres to the existing PCMCIA standard and is thus backwards compatible with existing devices, and which also facilitates analog audio communication between the computer's sound system and the PC Card. This would allow a PC Card modem to include advanced telephony capabilities, including telephone answering device and/or full-duplex speakerphone capabilities.

SUMMARY OF THE INVENTION

The present invention comprises a computer system including a PC Card socket, also referred to as a PCMCIA socket, for receiving a PC Card, wherein the computer system provides analog audio communication between the computer's sound system and the PC Card. The present invention also comprises a PC Card modem which is compatible with the PCMCIA specification and which includes telephone answering device and full-duplex speakerphone capabilities.

The computer system and PC Card of the present invention utilize one or more pins of the PC Card connector for analog audio communication between the computer's sound system and the PC Card. In the preferred embodiment, the computer system uses the digital SPKR pin and a voltage detect pin for analog audio communication. An alternate embodiment uses high address lines for analog audio communication. Other embodiments use different pins, as desired.

According to the preferred embodiment of the present invention, the PC Card uses the digital SPKR pin to provide analog audio signals from the PC Card to the computer sound system. As noted in the background section, the PCMCIA specification defines the SPKR signal as a digital audio signal. The PC Card of the present invention provides this digital audio signal and drives this signal to respective logic levels for normal call-progress functions. However, when the PC Card modem is configured in telephone answering device (TAD) or full-duplex speaker phone (FDSP) mode, the modem of the present invention preferably drives the digital SPKR signal at one-half VCC and superimposes the analog audio signal onto the SPKR signal. In the preferred embodiment, the computer system routes the SPKR signal to both the normal input of the PCMCIA controller chip and additionally through a limiting amplifier to a multiplexed analog audio input of the sound system. The digital audio signal is preferably disabled by the PCMCIA controller chip when the analog audio is in use.

A reserved-for-future-use (RFU) pin, pin 57, is preferably used to provide analog audio from the sound system to the modem. As noted in the background section, this pin is defined for an alternate voltage detect function. This RFU or voltage detect pin is also used for analog audio purposes according to the present invention. The audio output of the computer sound system is connected with appropriate protection circuitry to the voltage detect pin. In the preferred embodiment, the analog signal provided to the voltage detect pin represents the amplified audio signal output from the computer's internal microphone and it is not required to be switched. In an alternate embodiment, the analog signal provided to the voltage detect pin is implemented as a multiplexed output of the sound system to provide "music on hold" capabilities or other computer-generated audio to the telephone line. Thus, a signal can be driven to the voltage detect pin by the modem card during startup to provide an indication to systems that utilize the alternate voltage detect function, and this pin is also used for analog audio output from the computer sound system to the modem according to the present invention.

In an alternate embodiment, the PCMCIA modem uses the high order address pins of the PCMCIA connector for input and output analog audio instead of the SPKR and RFU pins. Modem devices do not use the high address lines during operation, and thus the computer system of the present invention preferably multiplexes these signals between address lines and analog audio input and output lines. The card and socket software, which operates the card, preferably controls the multiplexer to select the analog audio function when desired.

Therefore, the present invention provides a computer system having a PC Card socket conforming to the PCMCIA specification which includes analog audio communication between the computer's sound system and the PC Card socket. The present invention further includes a PCMCIA standard modem which includes telephone answering device and full-duplex speakerphone capabilities. The present invention requires little additional cost or changes to current computer systems. In addition, the PCMCIA modem of the present invention allows the computer's internal sound system to be used for hands-free VoiceView operation and also allows the computer's sound system to provide audio for modems that provide digital simultaneous voice-data (DSVD).

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

*PCMCIA System Architecture* by Don Anderson and available from Mindshare Press, 2202 Buttercup Dr., Richardson, Tex. 75082 (214) 231-2216, is hereby incorporated by reference in its entirety.

The PCMCIA specification, including version 2.1 as well as other versions, is hereby incorporated by reference in its entirety.

Computer System

Figure 1:
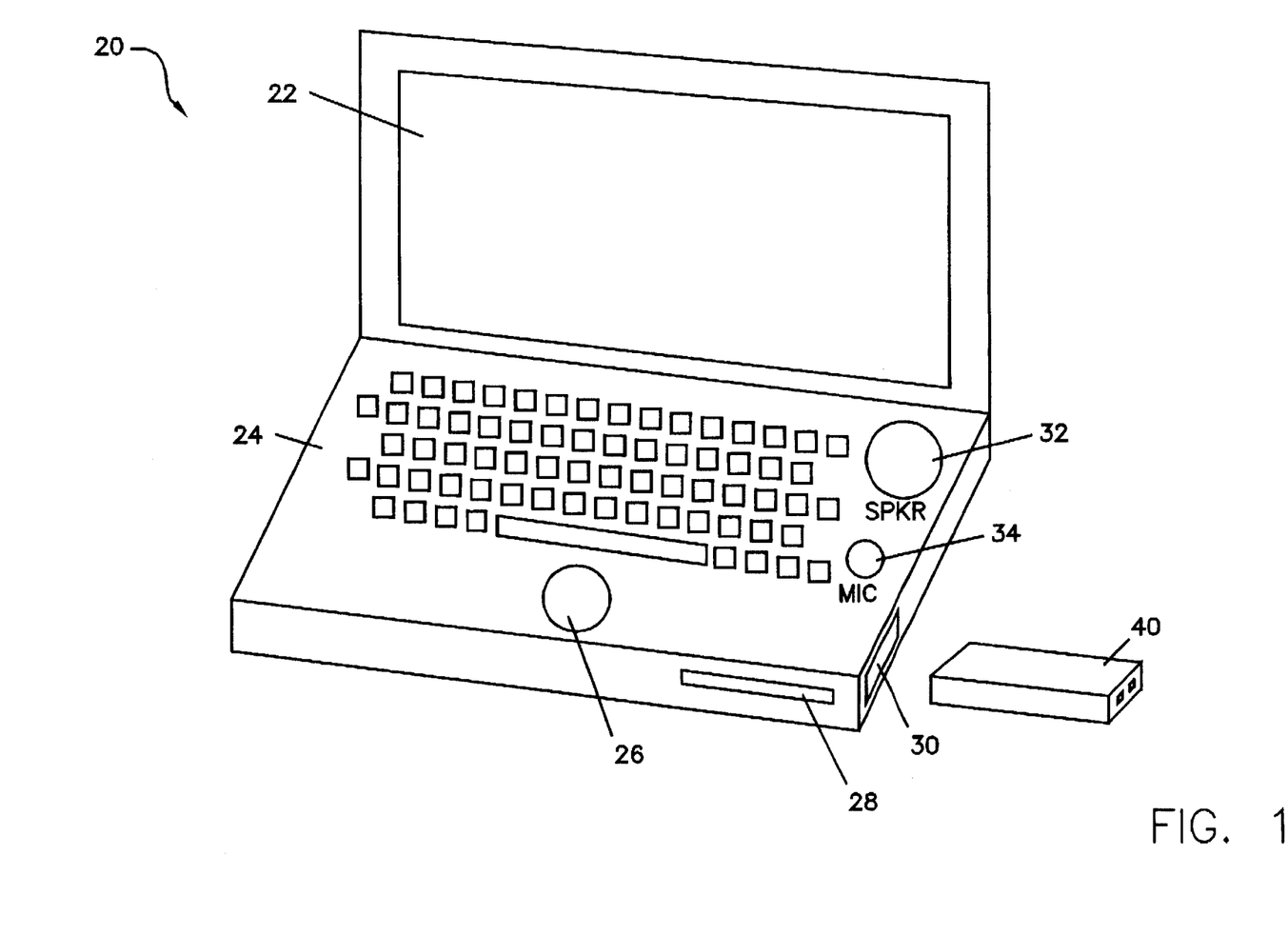
FIG. 1 illustrates a portable computer system including a PC Card Socket for receiving a PC Card according to the present invention.

Referring now to FIG. 1, a portable computer system is shown which includes a PC Card socket, also referred to as a PCMCIA socket, and which also includes a sound system. The computer system of FIG. 1 includes analog audio communication between the PC Card socket and the sound system according to the present invention. Thus, the computer system is adapted for receiving a PCMCIA modem having telephone answering device and fall duplex speakerphone capabilities according to the present invention. The system and method of the present invention can be incorporated into various types of computer systems which include PC Card slots, including the portable system shown in FIG. 1, desk top units, mini-tower units, as well as others.

As shown, the computer system 20 preferably includes a display screen 22, keyboard 24, mouse 26, and floppy drive 28. The computer system includes components generally found in all computer systems, including a CPU, system memory, one or more buses, and various peripheral controllers and devices. The computer system 20 includes a sound system including a microphone 34 and one or more speakers 32. The microphone 34 preferably includes an amplifier. In the present disclosure, the term sound system includes logic which transmits, processes, and/or stores audio signals, including one or more of a microphone, speakers, sound logic, codecs, and other audio signal processing logic.

The computer system 20 also includes a PCMCIA host bus adapter (FIG. 2) and corresponding one or more PC Card sockets or slots 30 for receiving one or more removable PC Cards 40 as shown. According to the present invention, one or more of the PC Card sockets 30 and the sound system are connected to allow analog audio communication between the sound system and the PC Card socket 30.

Figure 5:
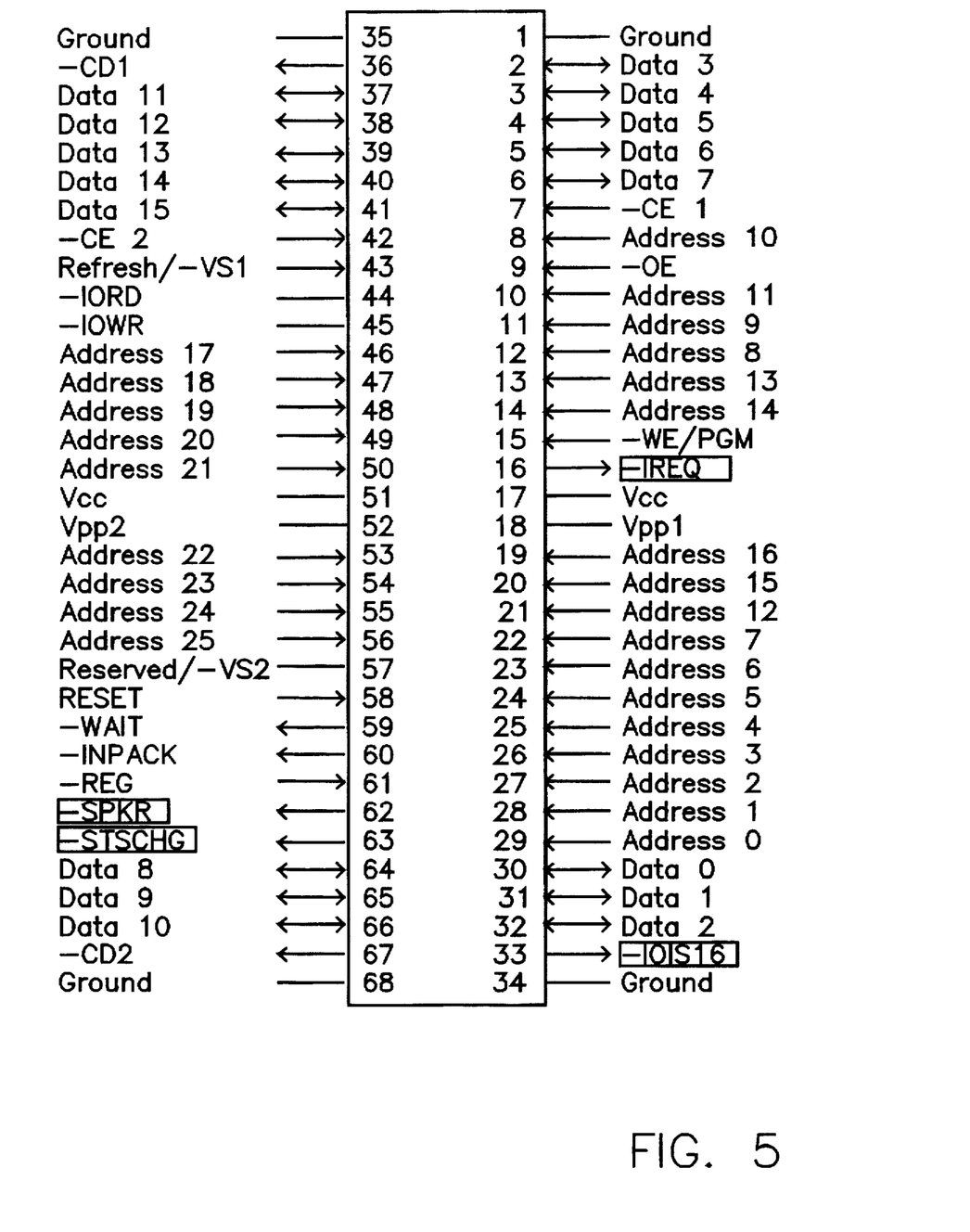
FIG. 5 illustrates pin definitions of the PC Card socket or PCMCIA I/O socket.

In the preferred embodiment the PC Card socket 30 is preferably compatible with the PCMCIA (Personal Computer Memory Card International Association) electrical specification, and includes additional signal definitions which allow analog audio communication between the computer's sound system and the PC Card 40. The pin definition of the PC Card socket is shown in FIG. 5. Thus the present invention allows operation of a PC Card modem with telephone answering device (TAD) and full duplex speakerphone (FDSP) capabilities.

The PC Card 40 preferably comprises a modem having telephone answering device and/or full duplex speakerphone capabilities according to the present invention. As shown, the PC Card modem 40 is adapted for insertion into the PC Card socket or PCMCIA socket 30 in the computer system 20. The modem 40 is inserted into the PC Card slot 30 and provides the computer system 20 with telephone answering device (TAD) and fill duplex speakerphone (FDSP) capabilities.

Figure 2:
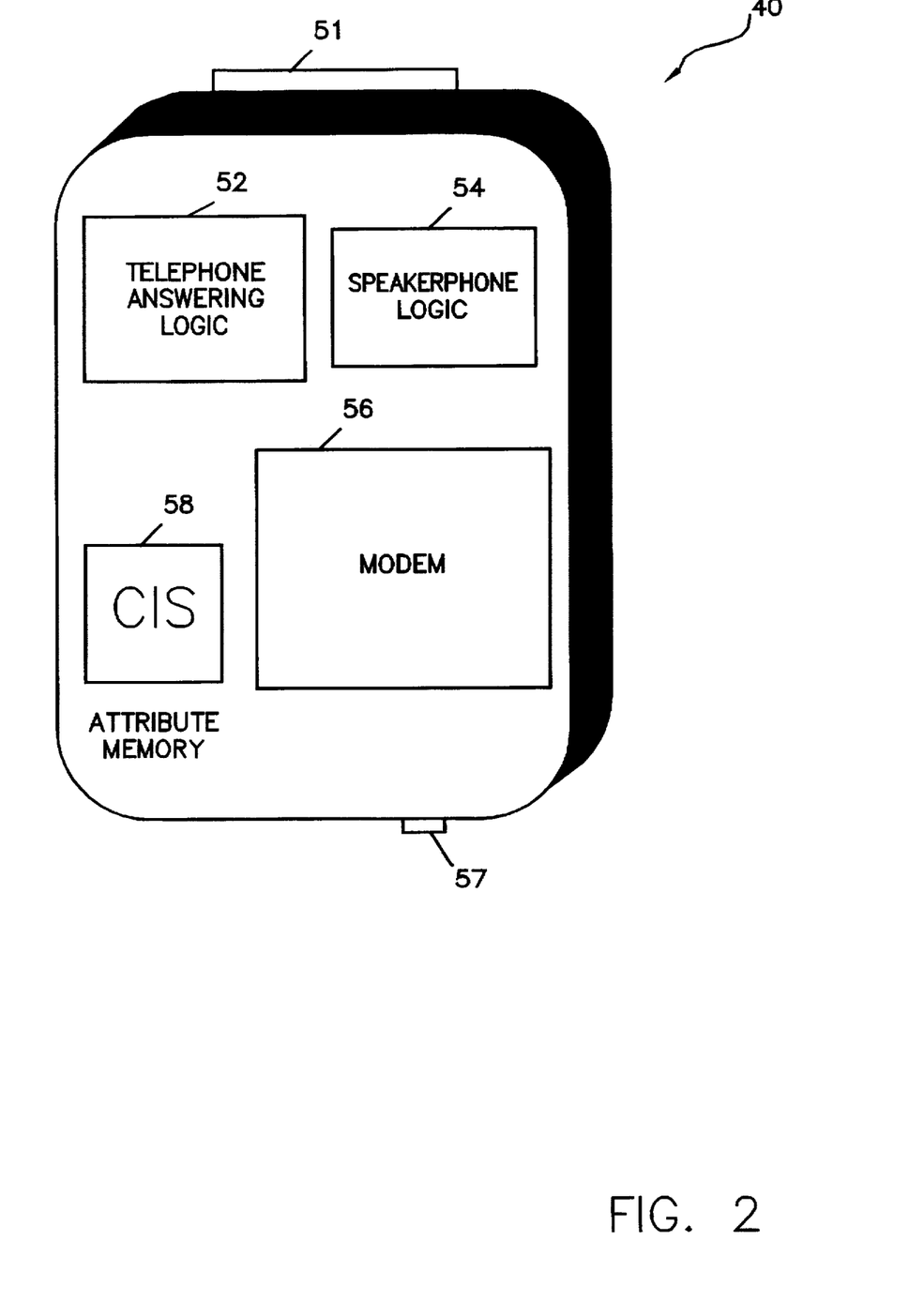
FIG. 2 illustrates a PC Card modem or PCMCIA modem having telephone answering device and full duplex speakerphone capabilities according to the present invention and which is adapted to be inserted into the PC Card socket of FIG. 1.

PC Card Block Diagram—FIG. 2

Referring now to FIG. 2, the PC Card 40 of the preferred embodiment is shown. The PC Card 40 of the preferred embodiment includes telephone answering device and speakerphone capabilities according to the present invention. As shown, the PC Card modem 40 includes a modem (modulator/demodulator) 56 which includes a connector 57 that preferably interfaces to a communication path, preferably an analog phone line. The PC Card modem 40 also includes telephone answering logic 52 which performs telephone answering device functions and speakerphone logic 54 which preferably performs full-duplex speakerphone functions. The PC Card 40 also includes card information structure memory which contains configuration options for the PC Card. The CIS memory 58 preferably contains information about the type, size, speed, and other information regarding the PC Card 40.

The PC Card 40 includes an adapter 51 which is adapted for mating with the PC Card socket 30. The adapter 51 includes a plurality of connectors which mate with corresponding ones of the plurality of pins comprised in the PC Card socket. In the preferred embodiment the PC Card is preferably compatible with the PCMCIA (Personal Computer Memory Card International Association) electrical specification, and includes additional signal definitions which allow the PC Card modem to operate with telephone answering device (TAD) and fill duplex speakerphone (FDSP) capabilities. In alternate embodiments, the PC Card is electrically and/or mechanically compatible with JEDEC (Joint Electronic Device Engineering Council) standards and/or JEIDA (Japanese Electronics Development Association) standards, among others.

When the PC Card 40 receives a telephone call via modem 56, the telephone answering logic 52 receives the voice signals and either stores the voice data within memory within the PC Card 40, or the PC Card 40 provides analog audio output signals to the computer system, as discussed further below. Also, when a user desires to listen to one or more telephone messages, if the telephone answering logic 52 stores the voice data in a memory within the PC Card 40, the telephone answering logic 52 provides analog audio output signals corresponding to the recorded voice message to the computer system for display by the computer speakers 32.

When the user desires to use the computer system 20 as a speakerphone, the user speaks into the microphone 34 and these signals are provided through the PC Card modem, i.e., the speakerphone logic 54 and modem 56, out to the communication path, preferably an analog phone line. Also, analog audio signals received by the modem 56 are provided through the speakerphone logic 54 to the sound system of the computer system 20, and ultimately to the one or more speakers 32 of the computer system 20.

Therefore, the PC Card modem 40 includes telephone answering device and full duplex speakerphone capabilities according to the present invention. In addition, the PC Card modem or PCMCIA modem 40 of the present invention allows the computer's internal sound system to be used for hands-free VoiceView operation and also allows the computer's sound system to provide audio for modems that provide digital simultaneous voice-data (DSVD).

Figure 3:
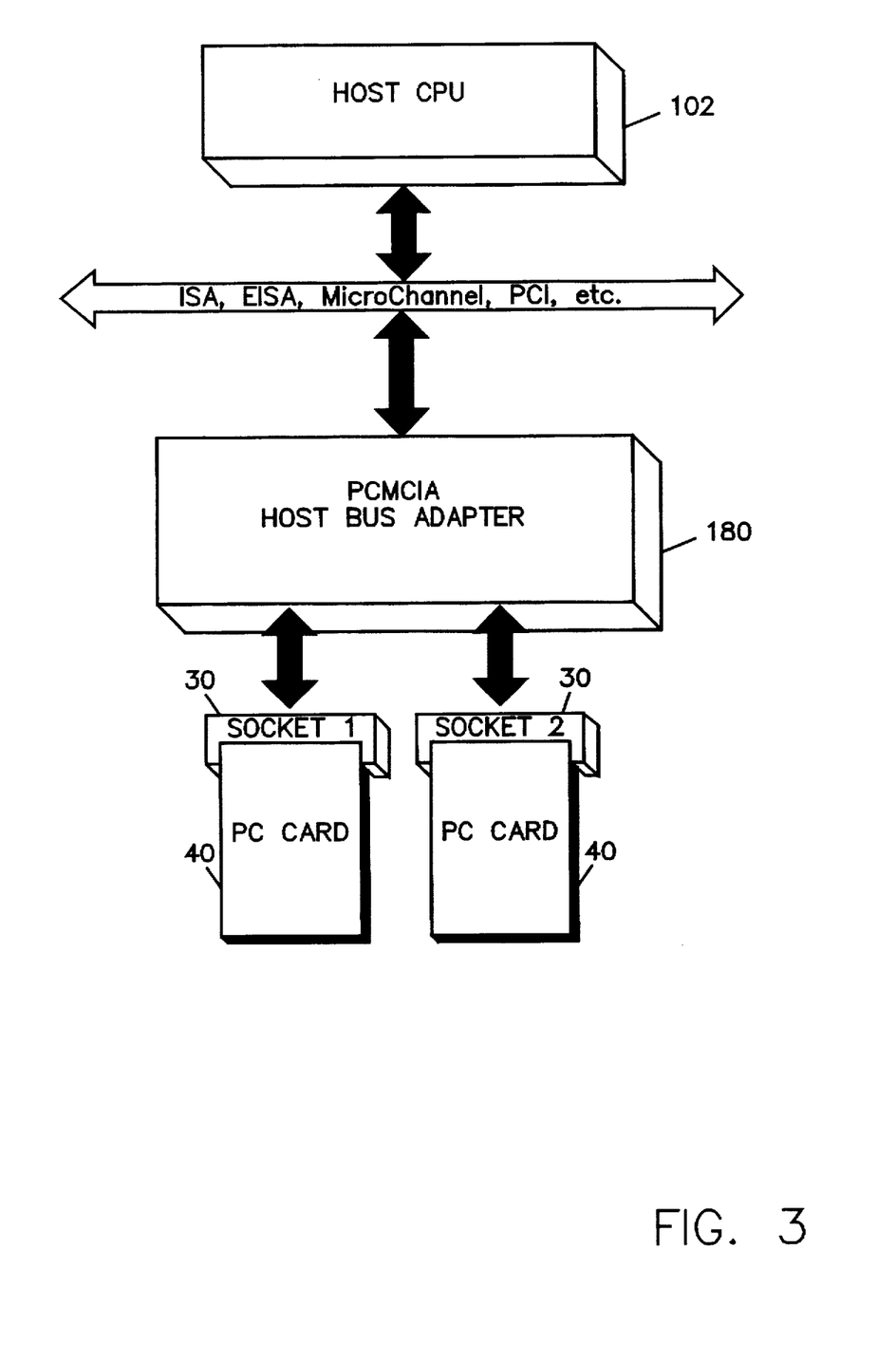
FIG. 3 is a block diagram illustrating the host CPU and PCMCIA host bus adapter architecture of the computer system of FIG. 1.
Figure 4:
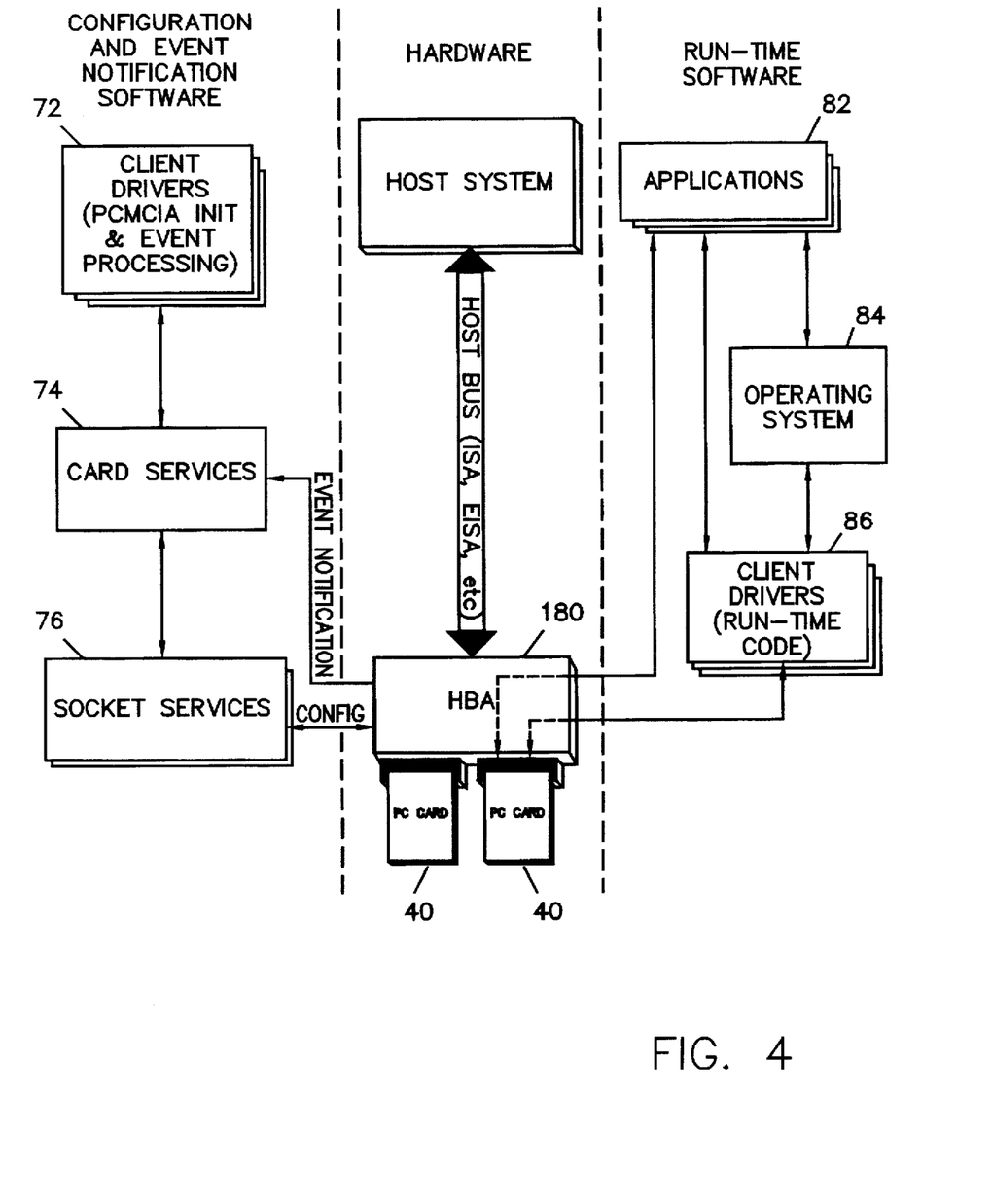
FIG. 4 illustrates hardware and software components in the computer system of FIG. 1 which interface to a PC Card.

Computer System Block Diagram—FIGS. 3–4

Referring now to FIG. 3, a block diagram illustrating the architecture of a computer system which includes a PC Card socket is shown. As shown, the computer system includes a host CPU 102 which interfaces to one or more expansion buses within the computer system. A PCMCIA host bus adapter 180, also referred to as a PC Card bus adapter, is coupled to the one or more expansion buses.

The PCMCIA specification is essentially a bridge bus technology, meaning that a PC Card socket developed according to the PCMCIA specification can be coupled to any number of buses or platforms. Thus the PCMCIA host bus adapter 180 can be coupled to any of various buses, including the industry standard architecture (ISA) or AT expansion bus, the extended industry standard architecture (EISA) bus, the microchannel (MCA) bus, the PCI (peripheral component interconnect) bus, and NuBus among others.

The PCMCIA host bus adapter 180 includes the PCMCIA controller logic which interfaces between the expansion bus of the computer system and the removable PC Card. As shown, the PCMCIA host bus adapter 180 interfaces to one or more PC Card sockets 30 which are adapted for receiving PC Cards 40 as shown.

Referring now to FIG. 4, a more detailed block diagram illustrating the hardware and software components of the computer system is shown. As shown, a computer system which includes a PC Card socket or PCMCIA socket 30 includes configuration software referred to as client drivers 72 which detect the presence of PC Cards 40, determine their configuration requirements, and program the PC Cards 40 for operation within the system. The PCMCIA specification includes an additional layer referred to as Card Services 74 which provide high level functions used by programmers to gain access to the PC Card 40 to determine its configuration requirements and also to request system resources. Card Services 74 perform system resource allocation for client drivers and maintain a data base in system resources that are available for assignment to PC Cards. Socket Services 76 comprise a set of BIOS-level drivers which handle the physical operations of the PC Card socket.

As shown in FIG. 4, application software executing on the host system operates in conjunction with operating system software 84 and client drivers 86 which interface to the host bus adapter 180. In the preferred embodiment of the invention, the applications software 82 includes software which facilitates the PC Card modem 40 having telephone answering device and/or full duplex speakerphone capabilities.

PC Card Socket Specification

Referring now to FIG. 5, a diagram illustrating the PCMCIA specification I/O socket 30 is shown. FIG. 5 illustrates the pin definitions or signals for the PC Card socket 30 which conform to the PCMCIA specification. As shown, the PC Card socket 30 includes a digital speaker pin referred to as -SPKR (pin 62, hereafter referred to as SPKR) which is used for providing a digital audio signal from the PC Card to the computer system. The PC Card socket also includes a reserved pin referred to as Reserved/-VS2, (pin 57, hereafter referred to as the voltage detect pin) which is defined in the PCMCIA version 2.1 specification for voltage detect functions. Pin 57 is used in conjunction with pin 43, referred to as Refresh/-VS1, to designate a VCC level for the PC Card. Thus, these combined signals provide voltage sense signals to the computer system. The PC Card socket also includes a plurality of address signals referred to as Address 0–Address 25.

In the preferred embodiment of the invention, the digital speaker signal referred to as SPKR (pin 62) and the Reserved/-VS2 pin, referred to as the voltage detect pin (pin 57), are used according to the present invention to provide analog audio signal communication between the PC Card 40 and the sound system within the computer system 20. In an alternate embodiment, the high address line pins, preferably one or more of address lines 22–25, corresponding to pins 53–56, are used to provide analog audio communication between the PC Card and the sound system in the computer system.

Computer System Block Diagrams—FIG. 6–9

Referring now to FIGS. 6–9, a block diagram of various embodiments of a computer system incorporating improved analog audio communication between the computer's sound system and the PC Card socket 30 according to the present invention is shown. In the preferred embodiment of the invention, the PCMCIA host bus adapter 180 is a PCI bus adapter coupled to the PCI bus. However, it is noted that the PC Card slot may be coupled to any of various types of expansion buses as noted above. Also, the computer system of FIGS. 6–9 are illustrative only, and the present invention may be incorporated into various other systems having various configurations, as desired.

The embodiments shown in FIGS. 6–9 provide bi-directional communication for analog audio signals between the PC Card 40 and the sound system 122 of the computer system 20. This allows PC Cards which corresponded to the PCMCIA electrical specification to include advanced telephony functions, such as telephone answering device functions and full-duplex speakerphone capabilities.

As shown, the computer system includes a central processing unit (CPU) 102 which is coupled through a CPU local bus 104 to a host/PCI/cache bridge or chipset 106. The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other local buses may be used, such as the VESA (Video Electronics Standards Association) VL bus.

Various types of devices may be connected to the PCI bus 120, including one or more PC Card bus adapters 180, as desired. In the embodiment shown in FIG. 1, a video adapter 170 and video frame buffer 172 are coupled to the PCI bus 120 for controlling video functions. A sound system 122 is preferably coupled to the PCI bus 120. The sound system 122 preferably includes sound logic 124, microphone 34 and speakers 32. The sound logic 124 may comprise amplification logic and/or analog to digital (A/D) and digital to analog (D/A) converters. In the preferred embodiment, the sound logic 124 comprises advanced sound functionality, such as SoundBlaster or SoundBlaster-compatible circuitry, which includes compression/decompression (codec) functionality and/or voice coder (vocoder) functionality. The sound logic 124 may also include sound functions such as MIDI and wavetable synthesis, among others. As shown, the speakers 32 are coupled to an output of the sound logic 124. Also, in the embodiment of FIG. 6, the microphone 34 is coupled to a microphone input of the sound logic 124.

A PC Card bus adapter 180, also referred to as a PCMCIA bus adapter, is coupled to the PCI bus 120. For more information on an embodiment of PC Card bus adapter 180, please see "PCMCIA System Architecture", referenced above, which is hereby incorporated by reference. PCMCIA socket 30 is connected to the PC Card bus adapter 180. The bus adapter 180 includes logic according to the present invention which interfaces between PC Card 40 and the respective expansion bus 120. Various other devices may be connected to the PCI bus 120, as desired.

Expansion bus bridge logic 150 is also preferably coupled to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including a hard drive 156. It is noted that one or more of the sound system 120 or the PC Card bus adapter 180 may be coupled to the expansion bus 152.

The expansion bus bridge logic 150 also couples to a peripheral expansion bus referred to as the X-bus 160. The X-bus 160 is used for connecting various peripherals to the computer system. As shown, an interrupt system 162, a real time clock (RTC) and timers 164, a direct memory access (DMA) system 166, and ROM/Flash memory 168 are coupled to the X-bus 160. Other peripherals (not shown) are preferably connected to the X-bus 160, including communications ports, diagnostics ports, command/status registers, non-volatile static random access memory (NVSRAM), etc.

Figure 6:
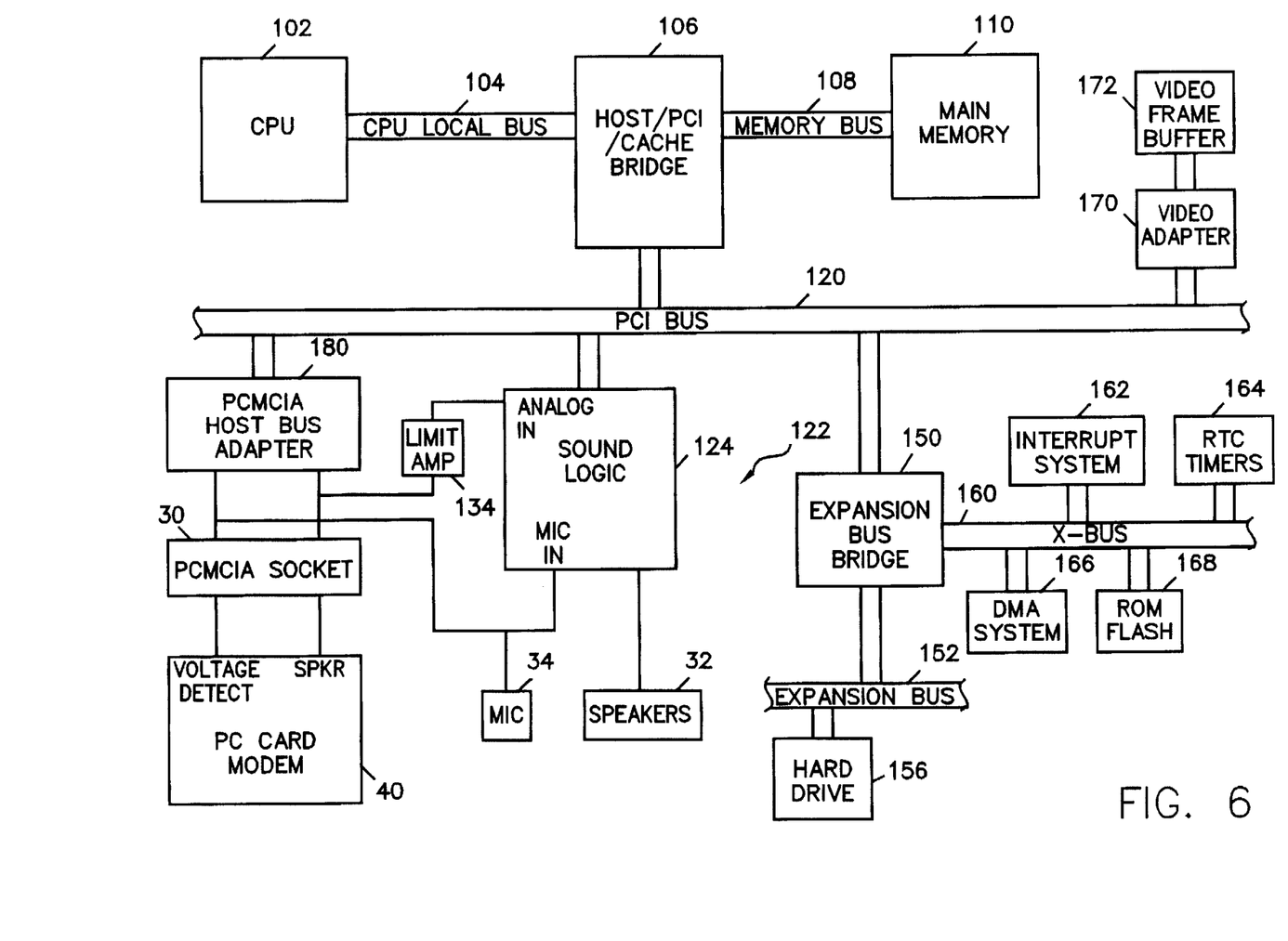
FIGS. 6 and 7 are more detailed block diagrams of the computer system of FIG. 1 illustrating various embodiments which provide analog audio signal communication between the PC Card socket and the computer's sound system using the digital speaker and voltage detect pins of the PC Card socket.

Embodiment—FIG. 6

In the embodiment of FIG. 6, the microphone 34 is connected to a microphone input of the sound logic 124 and also is connected to the voltage detect pin, pin 57, of the PC Card socket 30. As noted above, the microphone 34 preferably includes an amplifier. Alternatively, an amplifier (not shown) is included in the computer system which amplifies the signal from the microphone 34. When a user speaks into the microphone 34, the sound is provided to the microphone input of the sound logic 124 and is also provided through the voltage detect pin in the PC Card socket 30 to the PC Card modem 40. Appropriate protection circuitry is preferably provided either in the sound logic 124 or in the computer system separate from the sound logic 124 to prevent damage to the sound logic 124 and/or PC Card 40.

The SPKR pin of the PC Card socket 30 is connected through a limiting amplifier 134 to an analog input of the sound logic 124. The PC Card modem 40 generates an analog audio signal that is provided to the SPKR pin of the PC Card socket 30. As discussed above, the SPKR pin is defined for a digital audio signal, i.e., a signal that has two logic states of either 0 volts or +VCC volts. In the preferred embodiment, the PC Card 40 superimposes the analog audio signal onto one-half VCC. In other words, the PC Card 40 centers the analog signal on one-half VCC.

As shown, the analog audio signal is provided through the limiting amplifier 134 to the analog input of the sound logic 124. This analog audio signal is then provided through the sound logic 124, with any desired processing performed on the signal, and a resulting signal is provided as an output signal to the speakers 32. Therefore, the speakers 32 generate sound in response to the analog audio signal generated by the PC Card modem 40. The analog audio signal from the PC Card modem 40 may also be processed in the sound logic 124 and/or provided to other parts of the computer system. For example, the analog audio signal may be converted to digital form and stored in a memory of the computer system.

Figure 7:
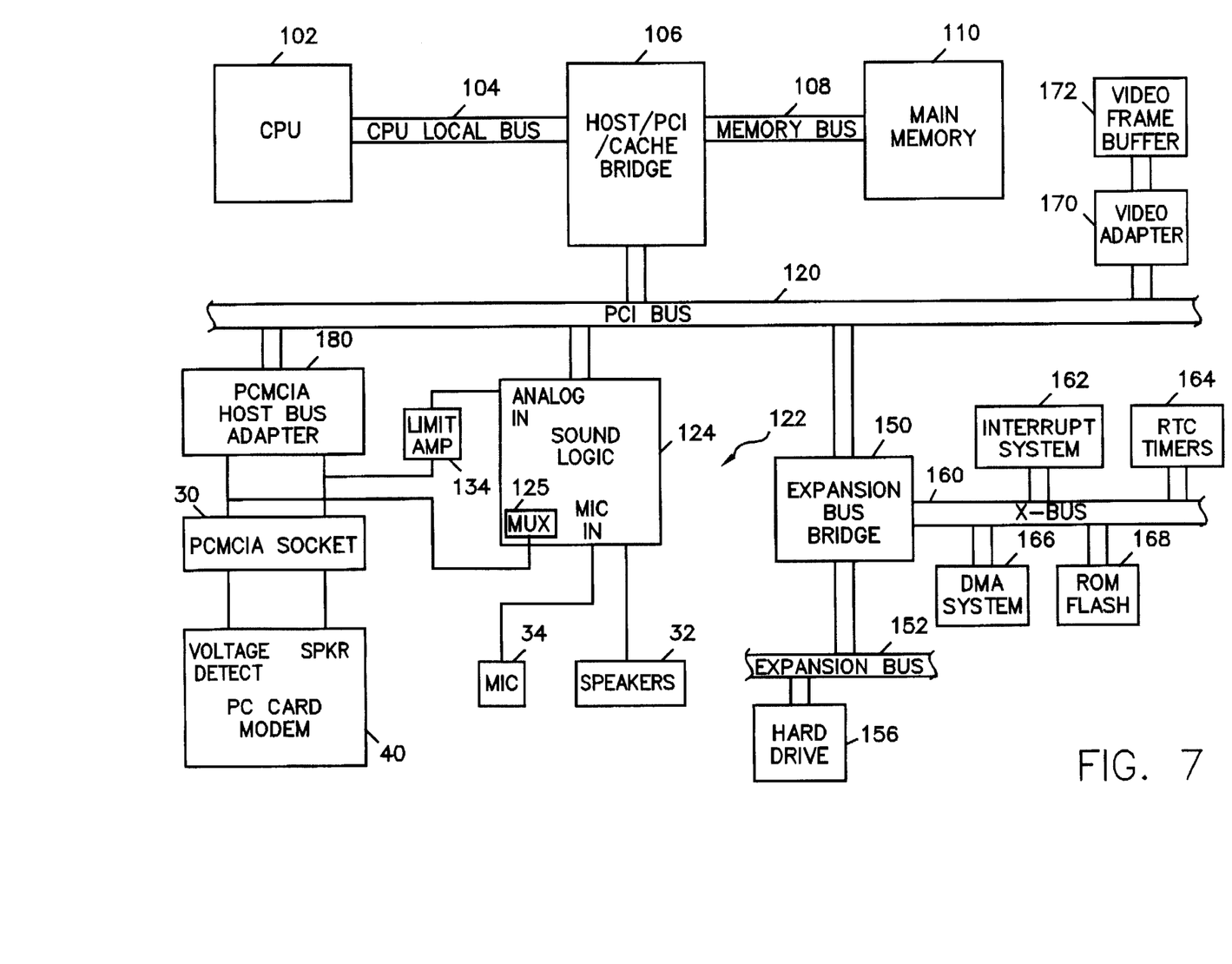

Embodiment—FIG. 7

FIG. 7 illustrates an alternative embodiment of the present invention. As with the embodiment of FIG. 6, the SPKR pin of the PC Card socket 30 is connected through a limiting amplifier 134 to an analog input of the sound logic 124. The microphone 34 provides an output to a microphone input of the sound logic 124. This microphone input is provided to an input of a multiplexer 125 preferably comprised in the sound logic 124 which in turn provides an output to the voltage detect pin of the PC Card socket 30. The multiplexer 125 also preferably receives one or more other analog output signals generated by the sound logic 124. The multiplexer 125 preferably selects a first path between the analog audio signal from the microphone 34 and the voltage detect pin of the PC Card socket 30 and selects a second path between an analog audio signal generated by the sound logic 124 and the voltage detect pin of the PC Card socket 30.

Thus, when the PC Card 40 is used as a fill-duplex speakerphone, and when the user of the computer system is talking to a person using a communications device, such as a telephone, at a remote location, the voice signals from the user are provided through the microphone 130 and multiplexer 125 and through the voltage detect pin of the socket 30 to the PC Card modem 40 and out through a telephone line to the respective person. If the user of the computer system desires to place the person on hold and then play music or other audio signals during the time that the person is on hold, software executing on the CPU 102 switches the multiplexer 125 to provide appropriate sound signals from the sound logic 124 through the multiplexer 125 and voltage detect pin of the socket 30 and through the PC Card modem 40 to the person on hold.

Figure 8:
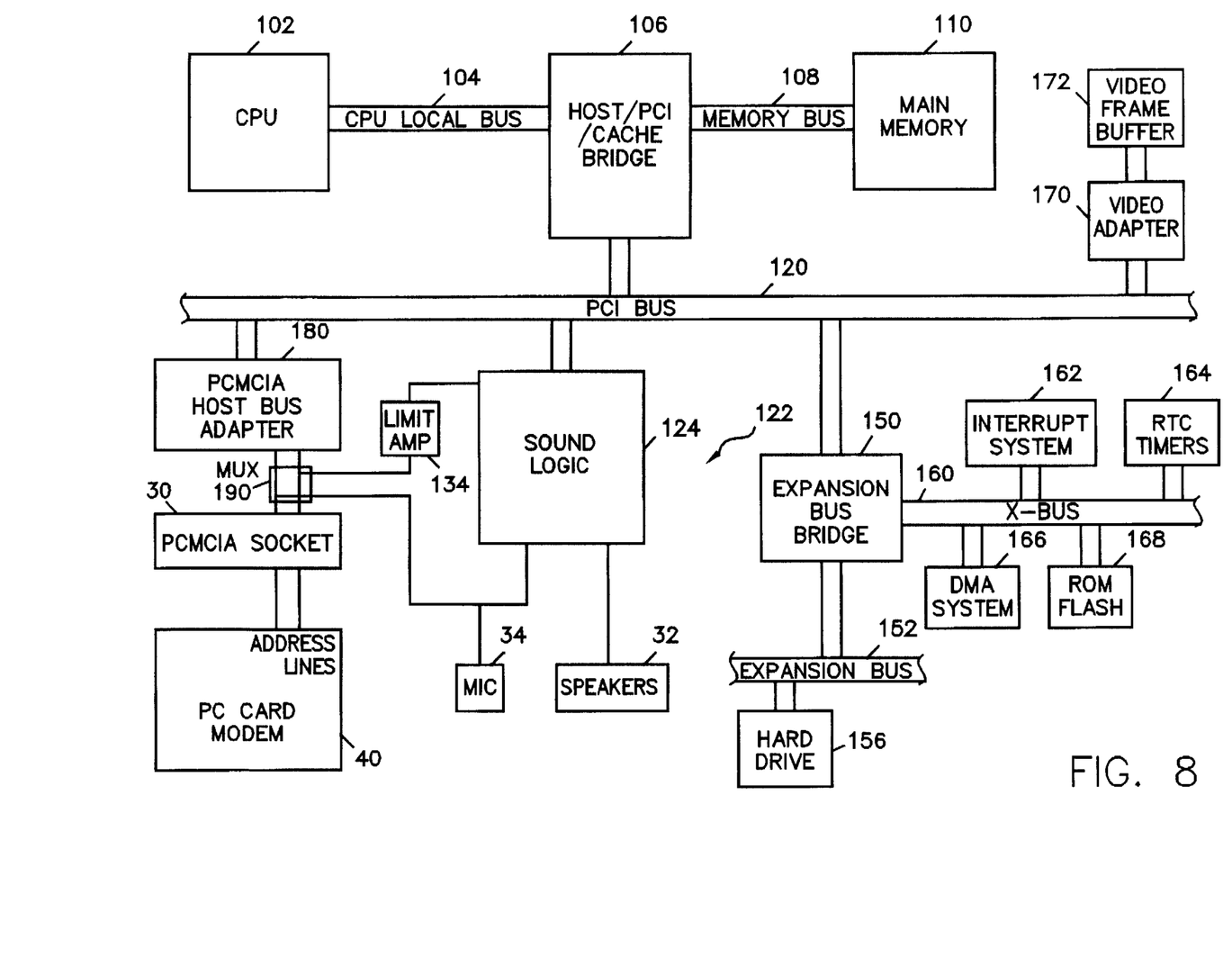
FIGS. 8 and 9 are more detailed block diagrams of the computer system of FIG. 1 illustrating various embodiments which provide analog audio signal communication between the PC Card socket and the computer's sound system using high address line pins of the PC Card socket.
Figure 9:
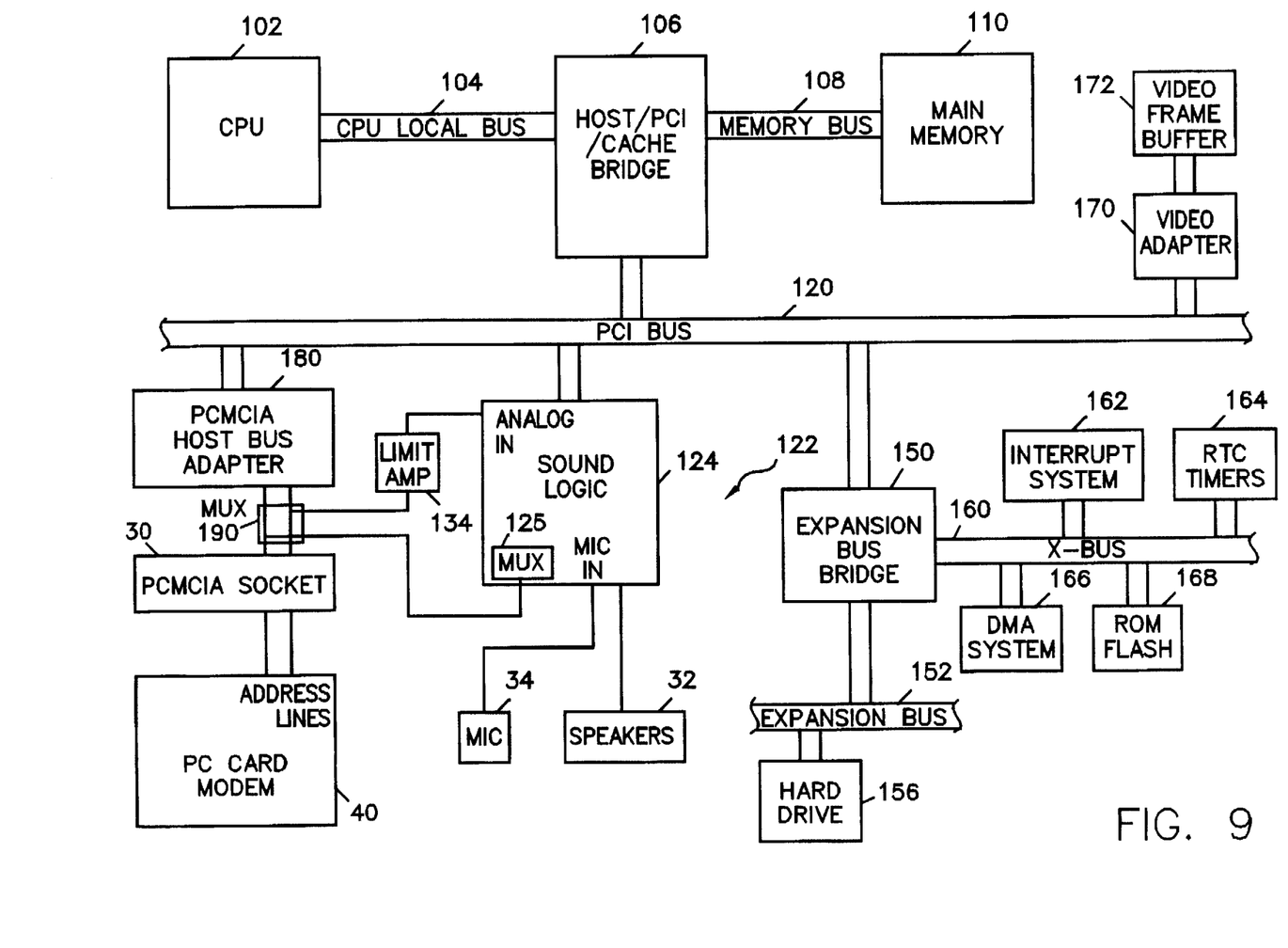

Embodiment—FIGS. 8 and 9

Referring now to FIGS. 8 and 9, alternate embodiments of the present invention are shown which use a multiplexer 190 between one or more pins in the PC Card socket 30 and the sound system 122. In the preferred implementation of this embodiment, the high address line pins of the PC Card socket 30 are used for analog audio signal communication between the PC Card 40 and sound system 122. These embodiments preferably use one or more of address pins 22–25 for analog audio communication. Other address pins, or other pins shown in the pinout of FIG. 5, may be used as desired.

As shown, these embodiments include the multiplexer 190 connected to the high address pins of the PC Card socket 30. The multiplexer 190 is also coupled to the PC Card bus adapter 180 and to the sound system 122 as shown. The multiplexer 190 selects either a first path between the one or more high address pins and the PC Card bus adapter 180 or a second path between the one or more high address pins and the sound system 122. In the preferred embodiment, the multiplexer 190 is initially configured to select the first path between the one or more high address pins and the PC Card bus adapter 180. When the PC Card 40 is inserted into the PC Card socket 30, the multiplexer 190 can select the second path between the one or more high address pins and the sound system 122 to provide analog audio communication between the PC Card 40 and the sound system 122.

A means is preferably provided which controls the multiplexer 190 and selects either the first path or the second path. In the preferred embodiment, the means which controls the multiplexer 190 is software which operates the PC Card 40, such as the client drivers 86, or applications software 82, or even the operating system 84. Alternatively, the software which controls the multiplexer 190 is either the client drivers 72, the Card Services 74, or the Socket Services 76. Software can control operation of the multiplexer 190, for example, by writing a bit to a register in the sound logic 124, wherein the register in the sound logic 124 provides a select signal to a select input of the multiplexer 190. Hardware means in the sound system 122 or in other parts of the computer system 20 may also be used to control the multiplexer 190, as desired.

Otherwise, the embodiments of FIGS. 8 and 9 substantially correspond to the embodiments of FIGS. 6 and 7, respectively.

Conclusion

Therefore, a computer system which includes a PC Card socket and which provides bi-directional analog audio signal communication between the PC Card socket and the sound system of the computer system is shown and described. The computer system of the present invention thus allows PC Card modem with advanced audio and/or telephony capabilities, such as telephone answering device capabilities or full-duplex speakerphone capabilities.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system which has improved audio communication between a sound system comprised in the computer system and a removable PC Card coupled to the computer system, comprising:

a sound system;

a bus;

a PC Card bus adapter coupled to said bus;

a PC Card socket coupled to said PC Card bus adapter, wherein said PC Card socket is for receiving one or more PC Cards, wherein said PC Card socket includes a plurality of pins;

a multiplexer coupled to one or more of said pins in said PC Card socket, wherein said multiplexer is also coupled to said PC Card bus adapter and said sound system, wherein said multiplexer selects either a first path between said one or more pins and said PC Card bus adapter or a second path between said one or more pins and said sound system;

a PC Card for insertion in said PC Card socket, wherein when said PC Card is inserted into said PC Card socket, said multiplexer can select said second path between said one or more pins and said sound system to provide analog audio communication between said PC Card and said sound system.

2. The computer system of claim 1, wherein said PC Card generates an analog audio output signal, wherein when said PC Card is inserted into said PC Card socket, and when said multiplexer selects said second path between said one or more pins and said sound system, said analog audio output signal generated by said PC Card is provided through said one or more pins of said PC Card socket to said analog audio input of said sound system.

3. The computer system of claim 1, further comprising:
one or more speakers coupled to said sound system, wherein said one or more speakers generate sound in response to said analog audio output signal generated by said PC Card provided through said one or more pins to said analog audio input of said sound system.

4. The computer system of claim 1, wherein said sound system generates an analog audio output signal, wherein when said PC Card is inserted into said PC Card socket, and when said multiplexer selects said second path between said one or more pins and said sound system, said analog audio output signal generated by said sound system is provided through said one or more pins of said PC Card socket to an input of said PC Card.

5. The computer system of claim 4, wherein said sound system includes a microphone which generates said analog audio output signal.

6. The computer system of claim 1, wherein at power-up of said computer system said multiplexer is initially configured to select said first path between said one or more pins and said PC Card bus adapter.

7. The computer system of claim 6, further comprising:
means coupled to said multiplexer for selecting either said first path or said second path.

8. The computer system of claim 1,
wherein said plurality of pins in said PC Card socket includes one or more high address pins defined for transmitting address signals;
wherein said multiplexer is coupled to said one or more high address pins in said PC Card socket, wherein said multiplexer selects either said first path between said one or more high address pins and said PC Card bus adapter or a second path between said one or more high address pins and said sound system;
wherein when said PC Card is inserted into said PC Card socket, said multiplexer can select said second path between said one or more high address pins and said sound system to provide analog audio communication between said PC Card and said sound system.

9. The computer system of claim 8,
wherein said sound system includes an analog audio input for receiving an analog audio input signal;
wherein said plurality of pins in said PC Card socket include a digital speaker pin defined for transmitting a digital audio signal, wherein said digital speaker pin is connected to said analog audio input of said sound system;

wherein said digital speaker pin provides analog audio communication between said PC Card and said sound system.

10. The computer system of claim 8,
wherein said sound system includes an analog audio output for providing an analog audio output signal;
wherein said plurality of pins in said PC Card socket include a voltage detect pin defined for transmitting a voltage detect signal, wherein said voltage detect pin is connected to said analog audio output of said sound system;
wherein said digital speaker pin provides analog audio communication between said PC Card and said sound system.

11. The computer system of claim 1, wherein said plurality of pins comprised in said PC Card socket electrically conform to the Personal Computer Memory Card International Association (PCMCIA) PC Card specification of 1995.

12. The computer system of claim 1, wherein said PC Card electrically conforms to the Personal Computer Memory Card International Association (PCMCIA) PC Card specification of 1995.

13. A computer system which has improved audio communication between a sound system comprised in the computer system and a removable PC Card coupled to the computer system, comprising:
a sound system;
a bus;
a PC Card bus adapter coupled to said bus;
a PC Card socket coupled to said PC Card bus adapter, wherein said PC Card socket is for receiving one or more PC Cards, wherein said PC Card socket includes a plurality of pins, said plurality of pins including one or more high address pins defined for transmitting address signals;
a multiplexer coupled to said one or more high address pins in said PC Card socket, wherein said multiplexer is also coupled to said PC Card bus adapter and said sound system, wherein said multiplexer selects either a first path between said one or more high address pins and said PC Card bus adapter or a second path between said one or more high address pins and said sound system;
a PC Card for insertion in said PC Card socket, wherein when said PC Card is inserted into said PC Card socket, said multiplexer can select said second path between said one or more high address pins and said sound system to provide analog audio communication between said PC Card and said sound system.

14. The computer system of claim 13, wherein said PC Card generates an analog audio output signal, wherein when said PC Card is inserted into said PC Card socket, and when said multiplexer selects said second path between said one or more high address pins and said sound system, said analog audio output signal generated by said PC Card is provided through said one or more high address pins of said PC Card socket to said analog audio input of said sound system.

15. The computer system of claim 13, wherein said sound system generates an analog audio output signal, wherein when said PC Card is inserted into said PC Card socket, and when said multiplexer selects said second path between said one or more high address pins and said sound system, said analog audio output signal generated by said sound system is provided through said one or more high address pins of said PC Card socket to an input of said PC Card.

16. The computer system of claim 13, wherein at power-up of said computer system said multiplexer is initially configured to select said first path between said one or more high address pins and said PC Card bus adapter.

17. The computer system of claim 1, wherein said plurality of pins comprised in said PC Card socket electrically conform to the Personal Computer Memory Card International Association (PCMCIA) specification, version 2.1.

18. The computer system of claim 1, wherein said PC Card electrically conforms to the Personal Computer Memory Card International Association (PCMCIA) specification, version 2.1.

19. The computer system of claim 13, wherein said plurality of pins comprised in said PC Card socket electrically conform to the Personal Computer Memory Card International Association (PCMCIA) PC Card specification of 1995.

20. The computer system of claim 13, wherein said plurality of pins comprised in said PC Card socket electrically conform to the Personal Computer Memory Card International Association (PCMCIA) specification, version 2.1.

* * * * *